Jan. 8, 1935.　　　　R. MacEACHEN　　　1,987,262
MATERIAL GATHERING AND LOADING APPARATUS
Filed Jan. 18, 1932　　　9 Sheets-Sheet 1
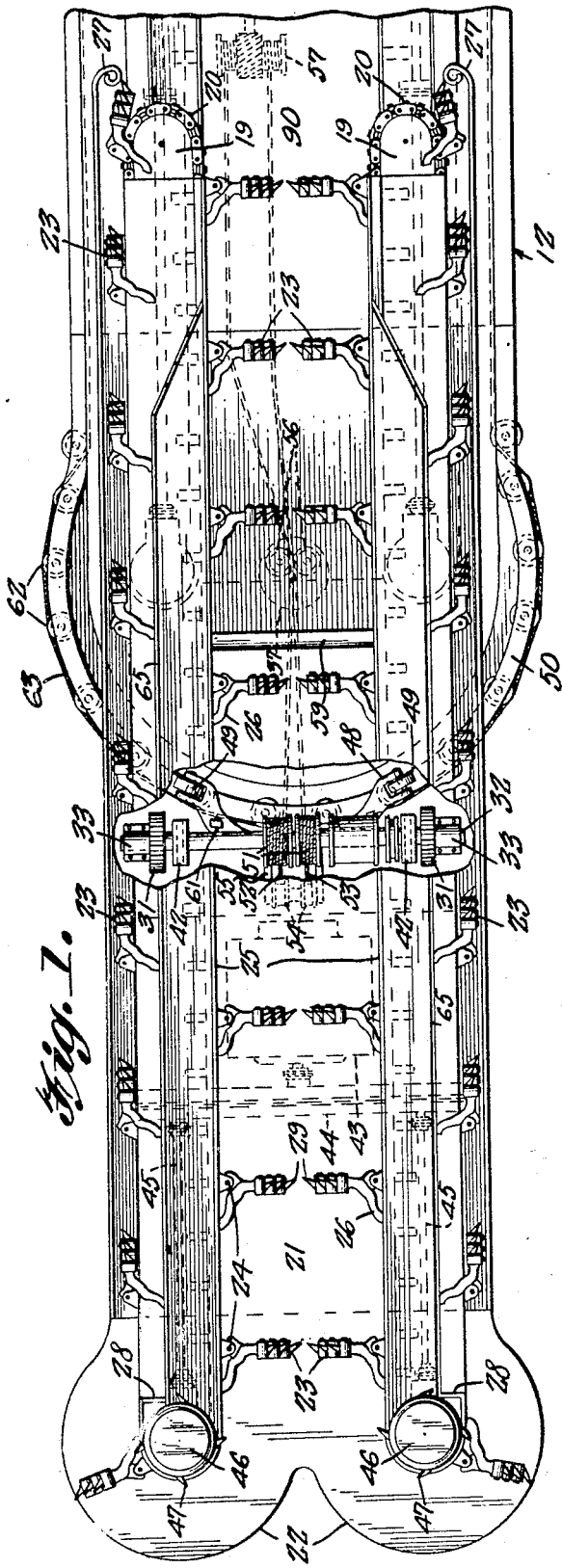
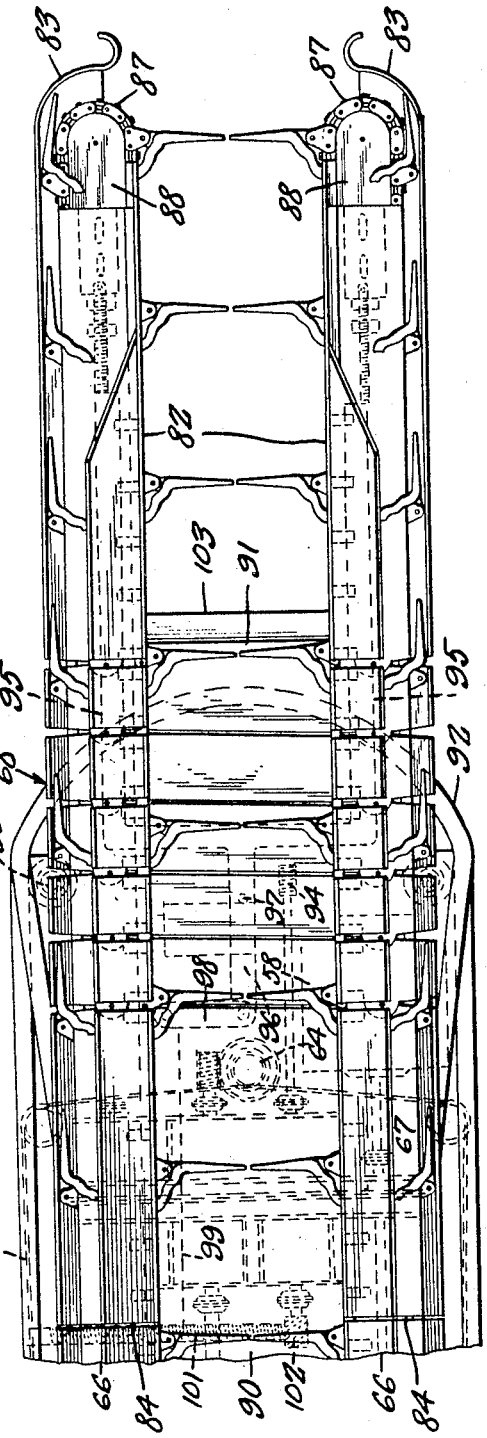
Roderick MacEachen,
INVENTOR
BY Victor J. Evans & Co.
ATTORNEY
WITNESS:

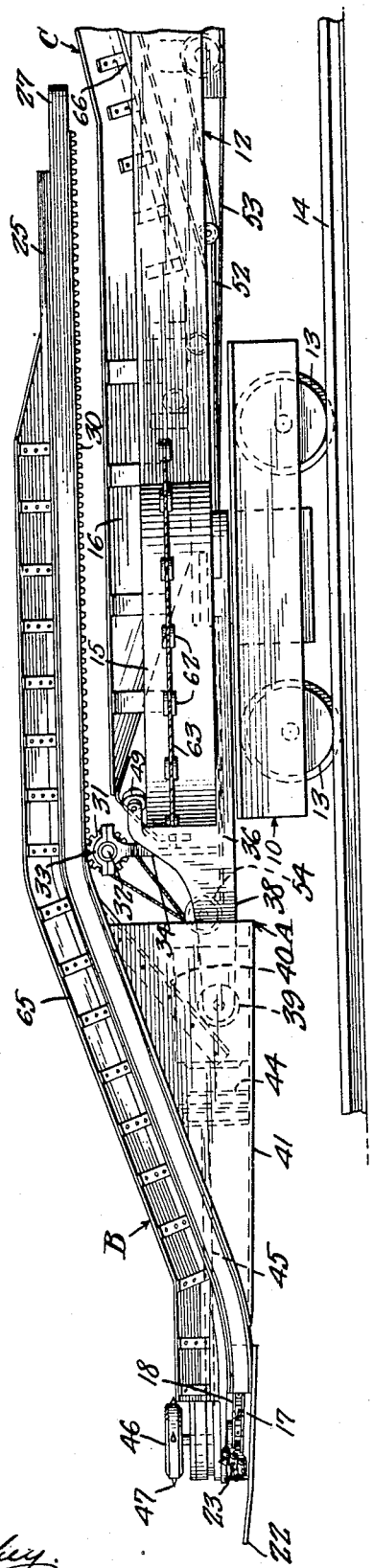
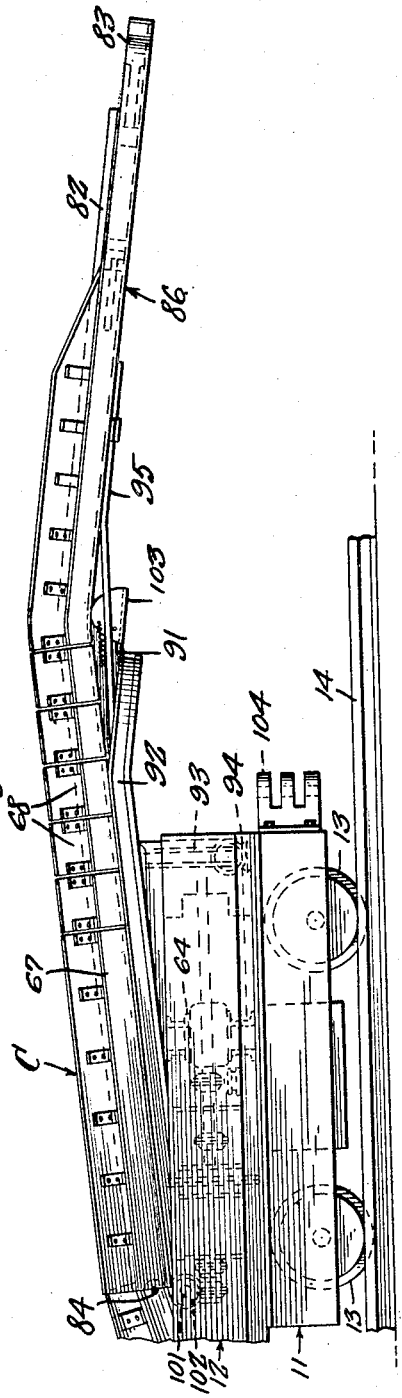

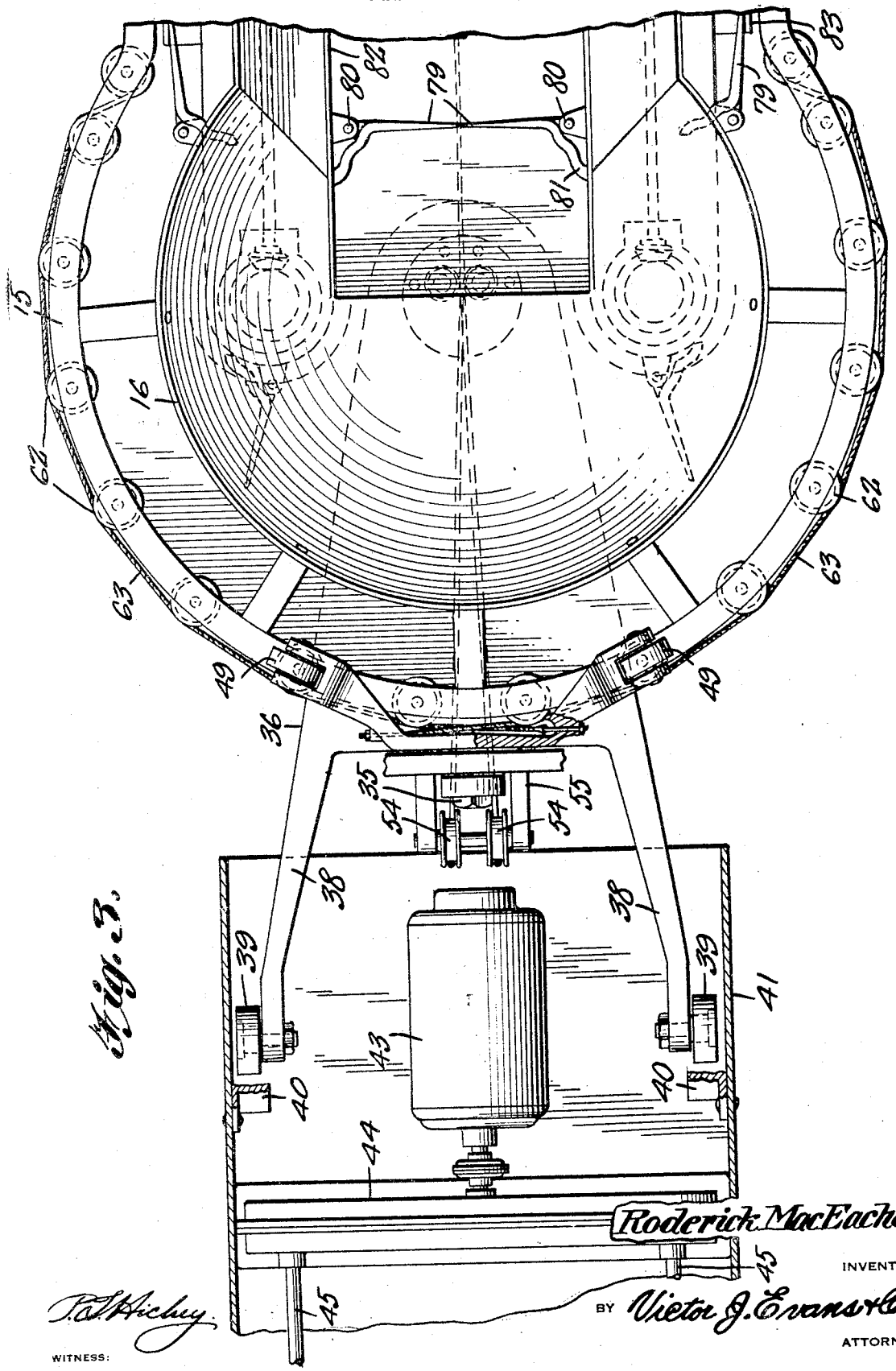

Jan. 8, 1935.   R. MacEACHEN   1,987,262
MATERIAL GATHERING AND LOADING APPARATUS
Filed Jan. 18, 1932   9 Sheets-Sheet 4
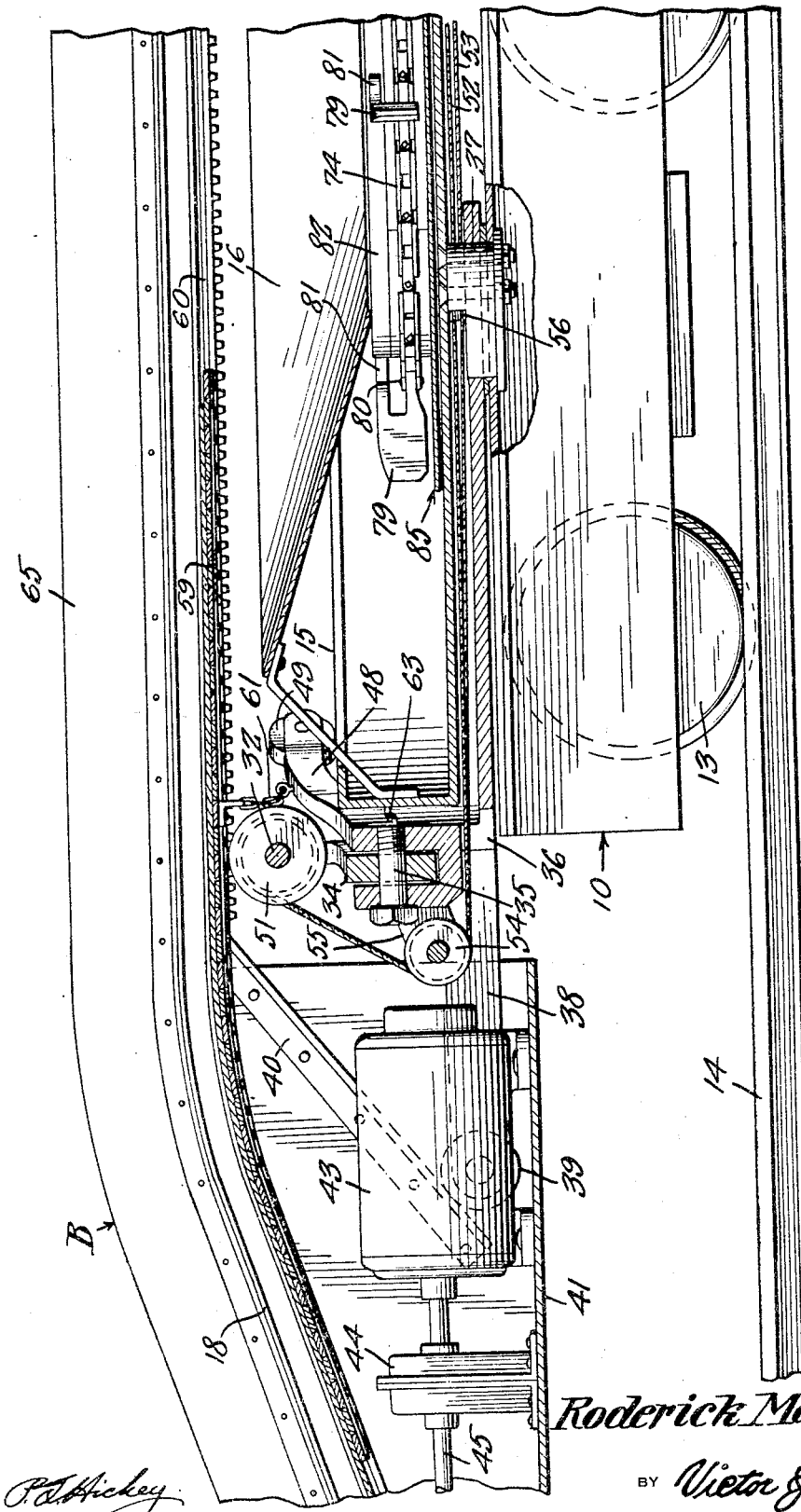

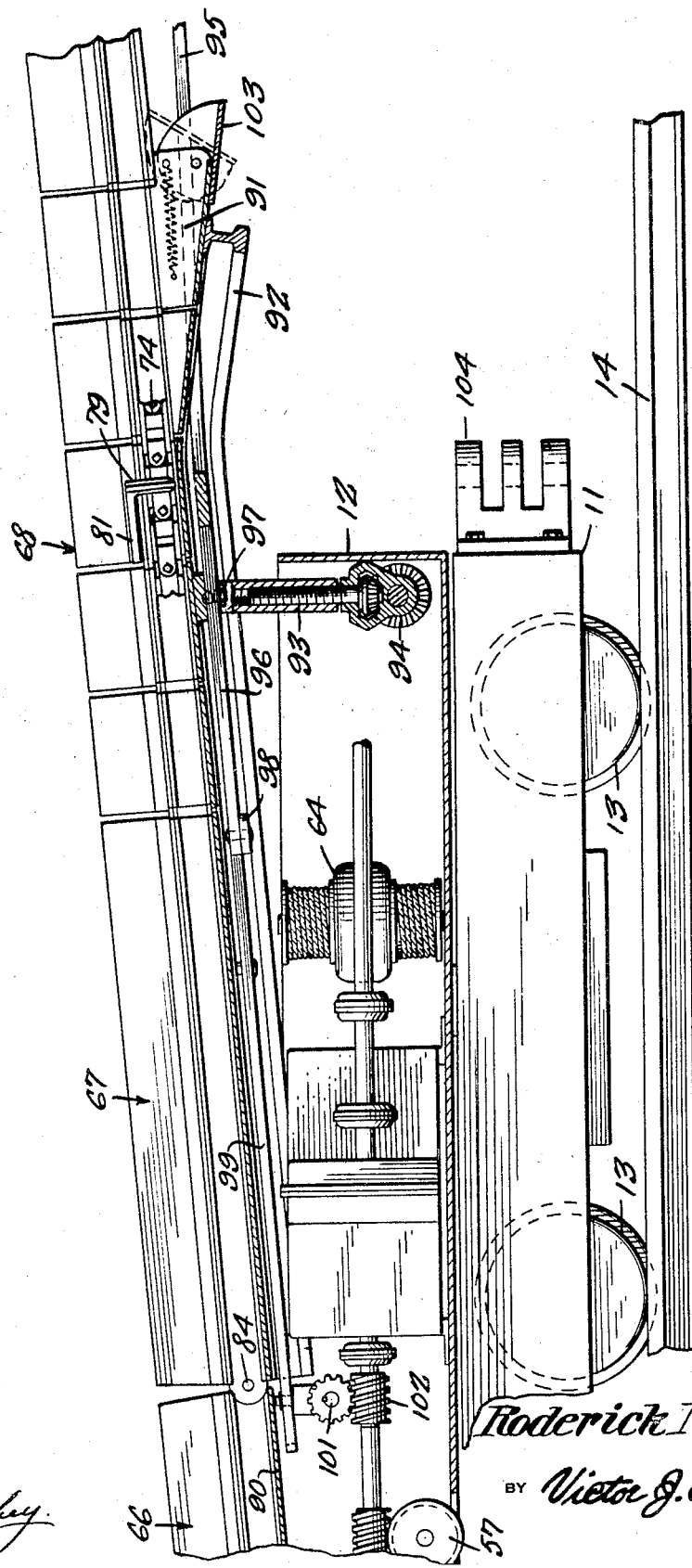

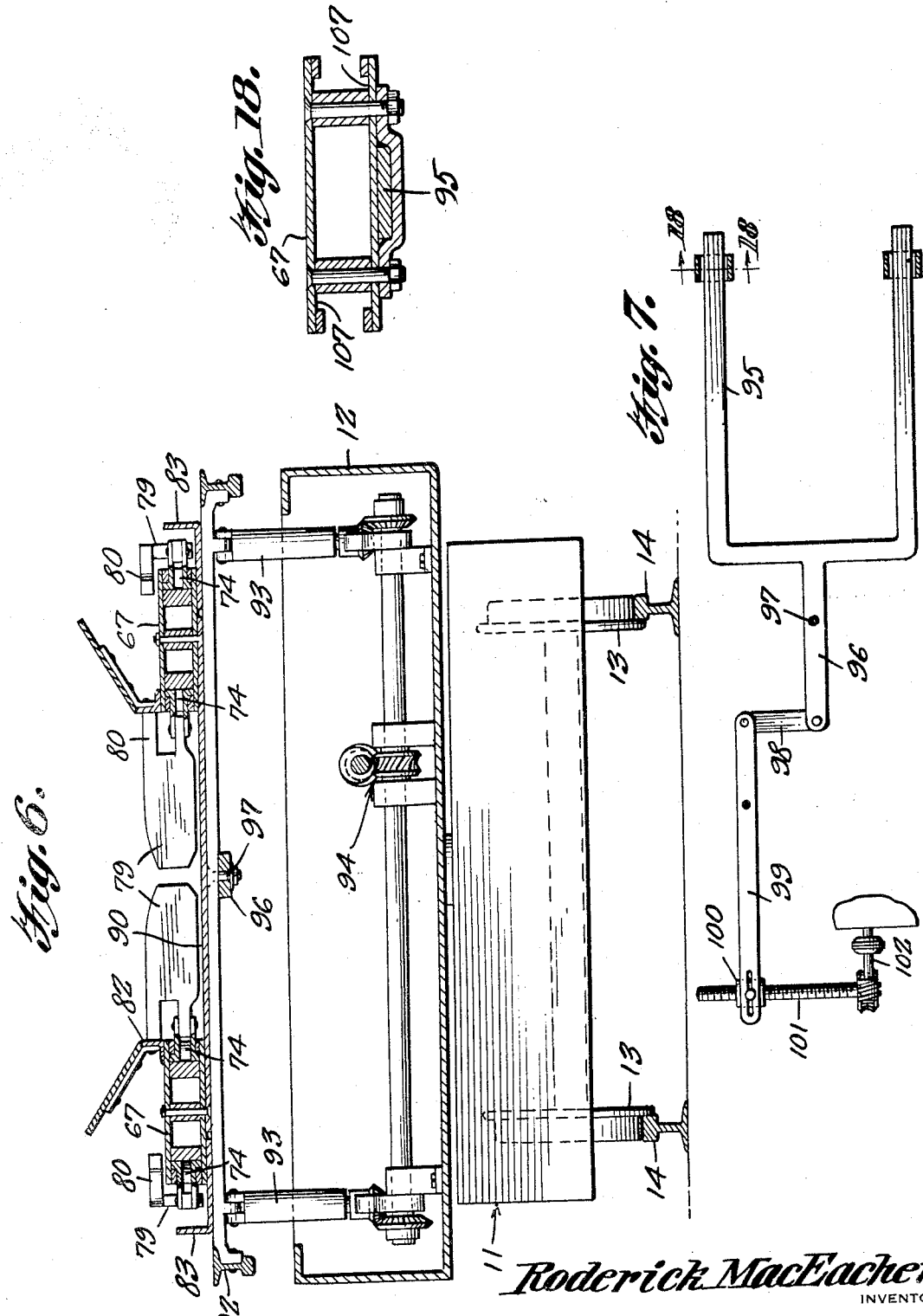

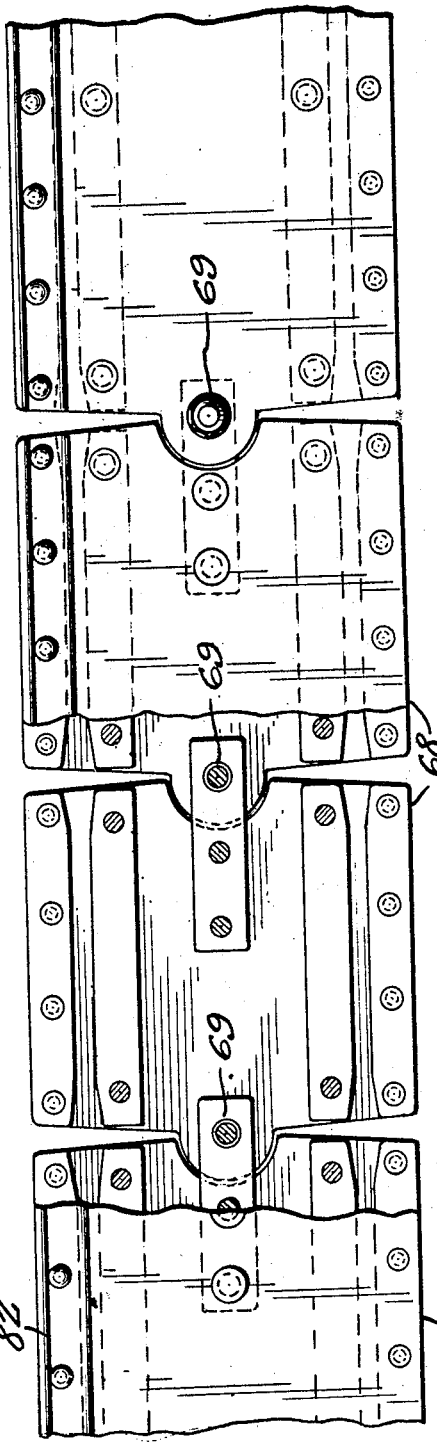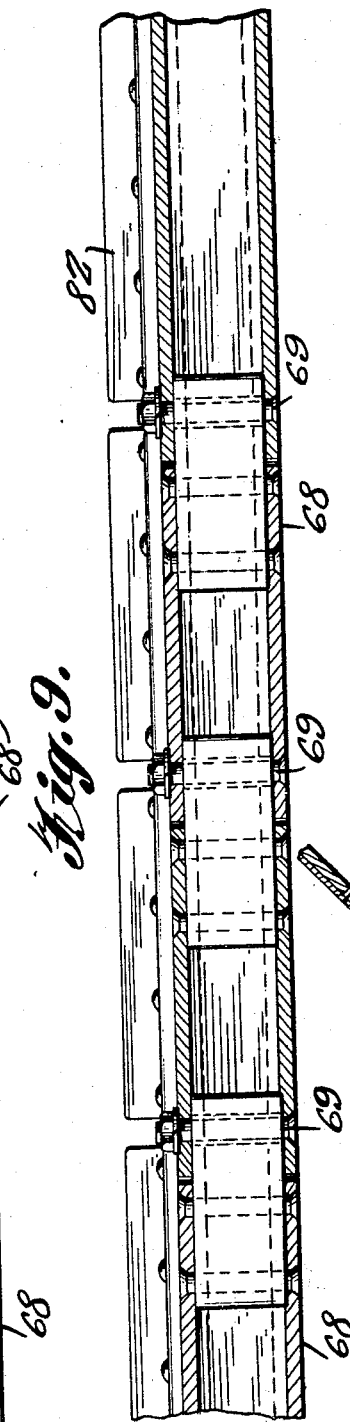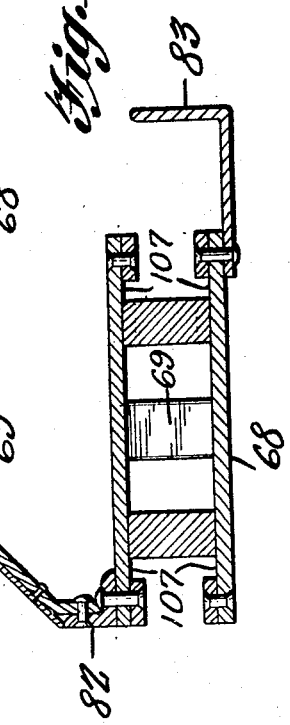

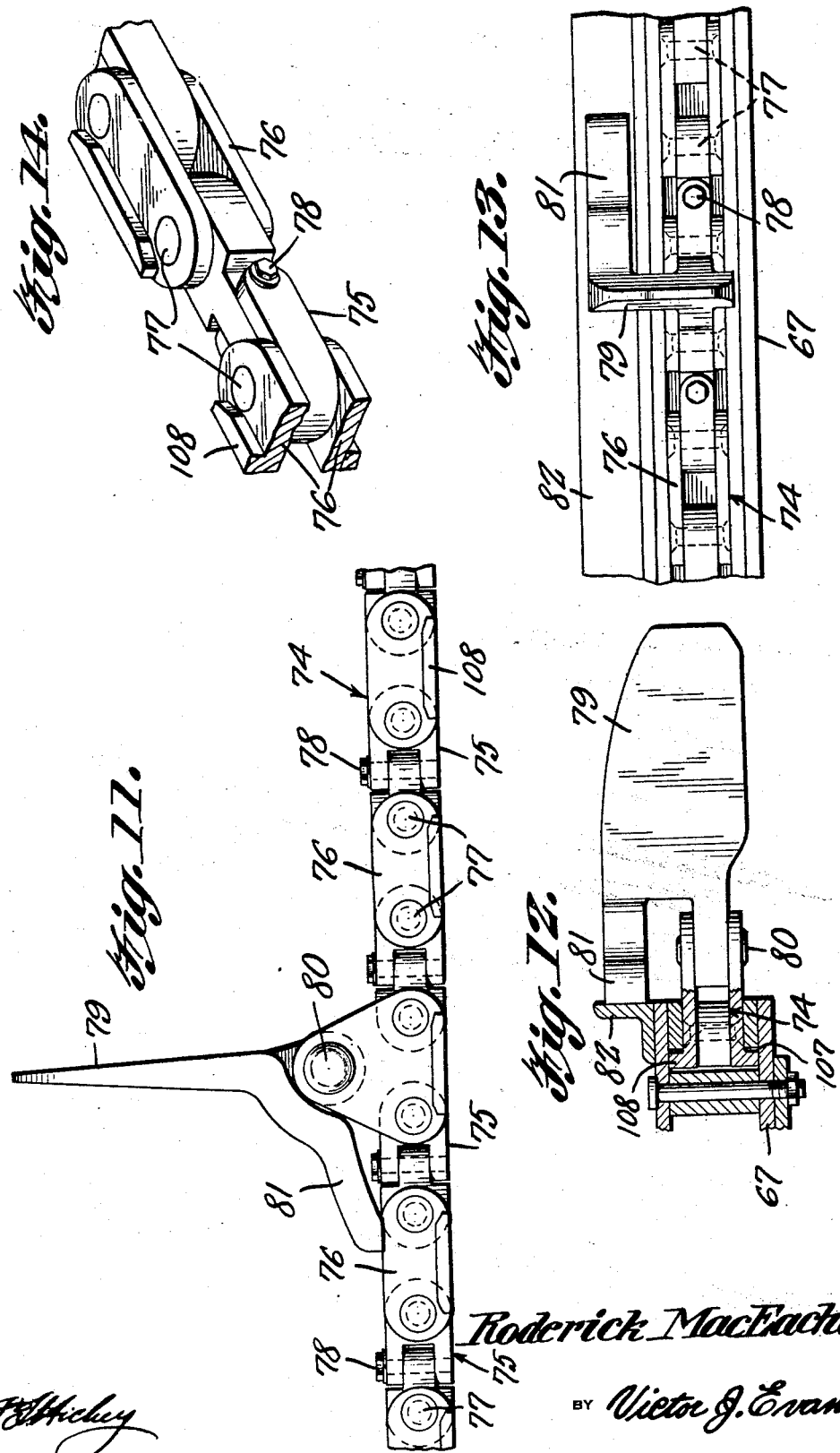

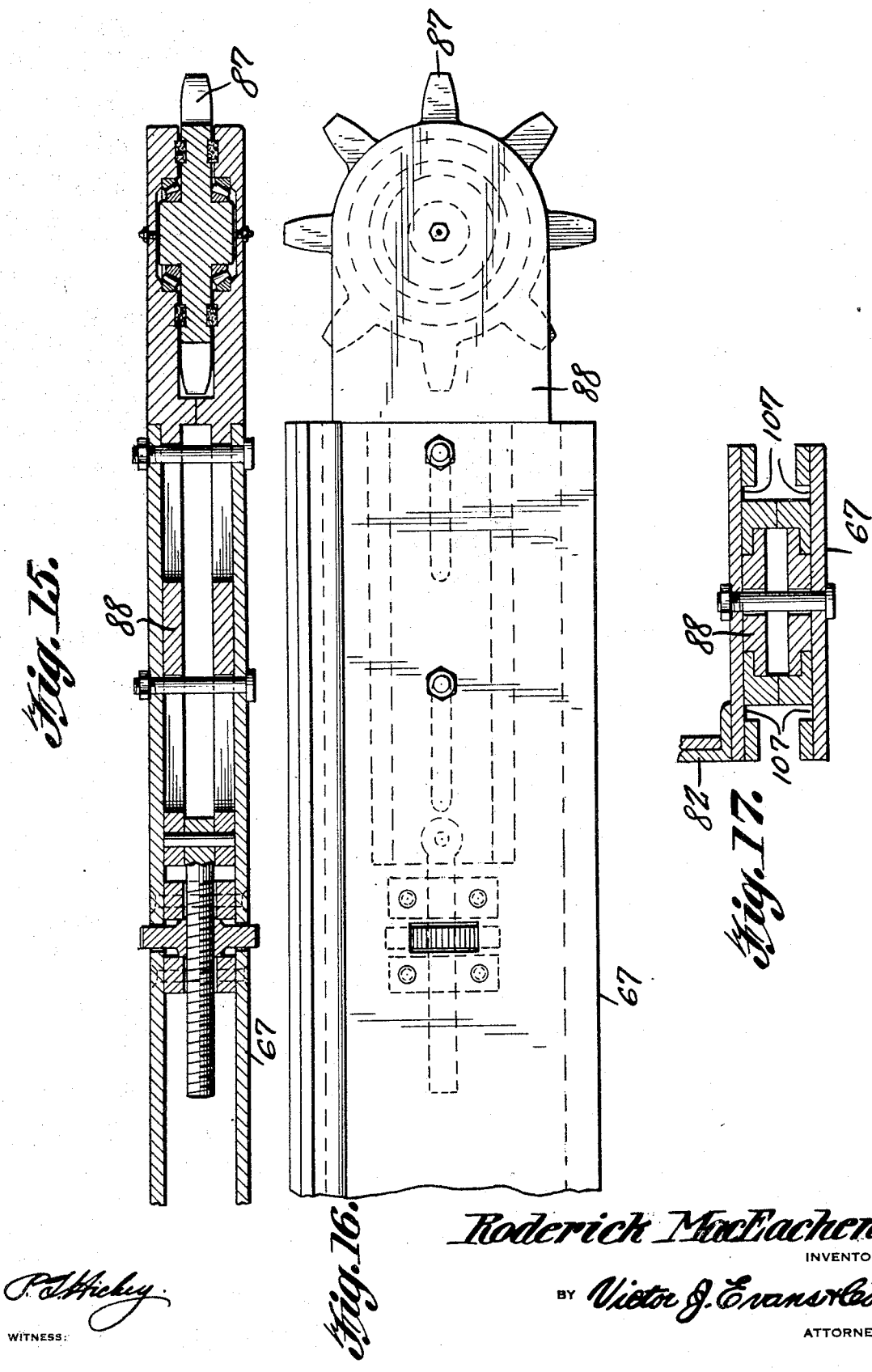

Patented Jan. 8, 1935

1,987,262

UNITED STATES PATENT OFFICE 1,987,262

MATERIAL GATHERING AND LOADING APPARATUS

Roderick MacEachen, Morgantown, W. Va.

Application January 18, 1932, Serial No. 587,417

16 Claims. (Cl. 198—8)

The invention relates to a material gathering and loading apparatus and more particularly to a mining machine for gathering and loading coal, ore or other materials of a loose nature.

The primary object of the invention is the provision of an apparatus or machine of this character wherein the material of the loose nature will be operated upon for the conveying of the same and the discharge thereof into a mine car or cars, the material being distributed therein so that a full and maximum load may be had in each car.

Another object of the invention is the provision of an apparatus or machine of this character wherein the delivery mechanism is of novel form as the same has a flexible characteristic and additionally may be raised and lowered so that said mechanism may be positioned with respect to the location of a mine car to enable the flow of loose material from the said mechanism thereinto, the mechanism having a wide range of adjustment to meet varying conditions in the placing of the mine car.

A further object of the invention is the provision of an apparatus or machine of this character, wherein the conveyor arrangement of the delivery mechanism is of novel form, it including flights which are mounted upon endless flight chains, these being guided and the flights automatically positioned for the conveying of the material and when inactive will fold inwardly so as to be out of the way and avoid injury to an attendant of the apparatus or machine.

A still further object of the invention is the provision of an apparatus or machine of this character wherein the adjustment of the delivery mechanism is automatically effected, thus avoiding the necessity of manual labor for such adjustment in the setting of the delivery mechanism for the transfer or delivery of loose material therein to a mine car or other depository and in the loading of such car or other depository a full and maximum load will be assured as well as the distribution uniformly of such load therein.

A still further object of the invention is the provision of an apparatus or machine of this character wherein the parts of the delivery mechanism are of a construction so that replacement may be had with dispatch or such parts conveniently adjusted for the proper working of the mechanism.

A still further object of the invention is the provision of an apparatus or machine of this character wherein the same in its entirety is of a construction as to permit convenient transportation and the placement thereof for service in loading cars or the like, all parts of the same being readily accessible for easy inspection and repair and requires but one man to operate said apparatus or machine.

A still further object of the invention is the provision of an apparatus or machine of this character which is comparatively simple in construction, thoroughly reliable and efficient in its operation, strong, durable, automatic in its working, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:—

Figure 1 is a top plan view of the gathering portion of the apparatus or machine constructed in accordance with the invention.

Figure 1A is a similar view of the loading and delivering portion of said apparatus or machine and is a continuation of Figure 1.

Figure 2 is a side elevation of that portion of the apparatus or machine shown in Figure 1.

Figure 2A is a side elevation of that portion of the apparatus or machine shown in Figure 1A.

Figure 3 is a fragmentary horizontal sectional view taken at the point of connection of the gathering mechanism with the carriage of the apparatus or machine.

Figure 4 is a fragmentary longitudinal sectional view through that portion of the apparatus or machine shown in Figure 3.

Figure 5 is a fragmentary vertical longitudinal sectional view through the flexible portion of the delivery mechanism of the apparatus or machine.

Figure 6 is a vertical transverse sectional view through the apparatus or machine taken at the point of location of the lifting jack.

Figure 7 is a plan view of the flexing means of the delivery mechanism.

Figure 8 is a fragmentary enlarged detail plan view of a flexing portion of the conveyor frame of the apparatus or machine, a portion thereof being broken away.

Figure 9 is a vertical longitudinal sectional view thereof.

Figure 10 is a vertical transverse sectional view therethrough.

Figure 11 is a fragmentary plan view of one of the flights and adjuncts of the delivery mechanism of the apparatus or machine.

Figure 12 is a vertical transverse sectional view thereof.

Figure 13 is an edge elevation.

Figure 14 is a fragmentary perspective view of the chain assembly.

Figure 15 is a fragmentary longitudinal sectional view through the chain tensioning head.

Figure 16 is a top plan view thereof.

Figure 17 is a vertical transverse sectional view of the same.

Figure 18 is a sectional view on the line 18—18 of Figure 7 looking in the direction of the arrows.

Similar reference characters indicate corresponding parts throughout the several views in the drawings.

Referring to the drawings in detail, the apparatus or machine A comprises in its entirety a pair of spaced motor propelled wheeled trucks 10 and 11 respectively, these supporting in their spaced relation to each other a carriage or body 12, the wheels 13 of the trucks being designed to travel upon track rails 14 laid under a system within a mine, the carriage or body 12 having a circular or rounded end 15 and within this rounded end is arranged a hopper 16 which is of a corresponding shape thereto.

Extended over and within the hopper 16 is a shuttled material gatherer mechanism B and loading or delivering mechanism C respectively, the details of construction of which will be hereinafter fully described.

The shuttled gatherer mechanism B comprises a pair of spaced substantially parallel universal jointed gatherer chains 17, the same being trained in the side guides 18 of a boom of substantially gooseneck formation with the outer end of said boom disposed at a lower level than the inner end thereof. The side guides 18 at opposite inner ends carry tensioning heads 19 having journaled therein sprocket wheels 20, these also being journaled at the outer ends of said guides and about which are trained the chains 17 and between these side guides is a material conveying trough 21 which has at its outer end rounded double shovels 22, these extending beyond the outer ends of the side guides 18 and are adapted to be brought to rest upon the floor of the mine when operating the apparatus or machine therein.

Each of the chains 17 carries thereon gatherer arms 23, these being pivotally mounted at 24 an equi-distance apart throughout the extent of said chain so that on the travel of the inner stretch of the chain longitudinally of the trough 21 these arms 23 will be projected at right angles to said stretch or the side guides 18 at their inner sides into gathering position and on said arms reaching the ends of the side guides at the inner end of the arms they will be caused to fold inwardly in parallel relation to the outer stretch of the chain until such arms reach the other ends of the side guides 18, that is to say, at the shovels 22 whence they will assume gathering position. To effect movement of the gathering arms 23 for gathering and non-gathering positions each side guide 18 has provided at its inner edge an abutment bar 25 against which is adapted to work an extension heel or trailing arm 26 on each arm 23 so as to hold the latter in gathering position braced during travel thereof through the trough 21, while located spaced from the outer edge of each guide 18 is an abutment bar 27 with which engages the arms 23 for the folding thereof when traveling outside of the trough 21.

At the shuttle end of the guides 18 and at the outer side thereof are trip shoulders 28 which form continuations of the bars 25 so that the heel or arm 26 of the arm 23 when meeting the shoulders 28 will ride upon the same and onto the bars 27 for the automatic shifting of the arms 23 to gathering position upon entering and traversing the trough 21 as should be obvious.

Each arm 23 has removably fitted therein cutting bits 29, these being arranged in gradually receding vertically related positions from the free ends of said arms 23 and function to cut material from a foundation, for example, coal within a mine to loosen the material during the working of the gathering arms 23 at the shovels 22, which arms will collect or gather the loosened material and convey the same into and through the trough 21 for the flow of the material into the hopper 16.

The gatherer mechanism B can be shuttled to its work and the mounting therefor comprises a longitudinally disposed toothed rack 30 on the underside of each side guide 18 at its inner end portion, which rack 30 meshes with a rack pinion 31 fixed to a horizontal transversely disposed shaft 32 journaled in the bearings 33 of a substantially U-shaped cradle 34 centrally pivoted at 35 to a laterally swinging coupling 36 at its center, the same at one end engaging the king bolt 37 of the truck 10 which bolt extends into the rounded end 15 of the carriage or body 12 centrally of this end, while the other end of the coupling 36 is forked to provide the spaced horns 38 carrying rollers 39 at their ends engaging angle strips 40 of a housing 41 depending from the outer end of the boom, these angle strips 40 permit the raising and lowering action of the boom when the same is being shuttled to and from the work. Engaging the shaft 32 are supports 42 which are slidably joined with the side guides 18 of the boom and in this manner the latter can vertically swing and also shift laterally to assume angular positions. Furthermore by the pivotal connection 35 of the cradle 34 with the coupling 36 the said boom is permitted for lateral tilting action whereby the shovels 22 when contacting with the floor of a sloping kind of the mine will automatically accommodate itself to the inclination of such floor and in this position will not in any manner disturb the working of the gatherer mechanism B.

Within the housing 41 is a suitable power motor 43 having connection through suitable gearing (not shown) within a gear casing 44 with operating shafts 45, these through suitable gear connections at the outer ends of the side guides 18 of the boom operate the chains 17 having the gathering arms 23 thereon.

Associated with the chains 17 at the outer ends of the side guides 18 and operatively connected therewith are rotatable snubber disks 46 having peripheral cutting teeth 47 which serve to snub the material when it does not fall freely and in general to facilitate the operation of gathering the material into the gatherer mechanism B of the apparatus or machine.

The coupling 36 has bearings 48 carrying traction rollers 49 these overhanging and engaging the circular track 50 at the rounded end 15 of the carriage or body 12 and in this manner easy swinging movement laterally of the coupling 36 is assured during angular disposition of the gatherer mechanism B.

On the horizontal shaft 32 are fixed a pair of windlasses 51 these having reversely wound thereon the actuator cables 52 and 53 respectively which are trained over guide pulleys 54 journaled in a bracket 55 on the cradle 34 at its center, the cables being extended centrally of the king bolt 37 between double pulleys 56 and thence reversely wound upon a double power pulley 57 operated through gearing connection (not shown) with a suitable power motor 58, the double pulleys 56 upon the king bolt being disposed with relation to the center of said bolt so that on any angular disposition of the gatherer mechanism B it will not interfere with or disturb the cables 52 and 53 which on operation thereof will transmit motion to the pinions 31 meshing with the rack 30 so that the said boom of the gatherer mechanism B will be automatically shuttled to and from the work as should be apparent.

Arranged at the inner end of the trough 21 is a bottom section 59 and the side guides 18 of the boom have the guideways 60 accommodating said bottom 59, these guideways 60 being disposed for a distance at the inner ends of said guides 18 so that when the gatherer mechanism B is shuttled to the work the bottom section 59 by reason of its disposition to the trough 21 will function to extend the said trough well over the hopper 16 whereby the gathered material carried though the trough will flow off of the bottom section 59 into the hopper. The bottom section 59 is anchored stationary through the medium of a chain 61 to the bearings 33 so as not to move with the boom on the shuttling of the same. Thus it will be seen that at all times the inner end of the boom of the gatherer mechanism B will be open to the hopper 16 whether the said boom is shuttled to the work or away from the same and in this fashion the gathered material will be assured of flowing into the hopper during the operation of the apparatus or machine, the bottom section 59 being seated to overhang the said hopper irrespective of the shuttle action of said mechanism B.

It should be apparent that by reason of the mounting of the gatherer mechanism B it can be extended or retracted by shuttle action relative to the carriage or body 12 and the extension is of maximum range so as to enable the reaching of work a considerable distance from the point of location of the carriage or body 12 of the apparatus or machine. Whether the mechanism B be extended or contracted it is susceptible of delivering its gathered material directly into the hopper 16 and also can be angularly disposed or brought to longitudinal alignment or substantially so or assume a side tilt with respect to the carriage or body 12 so that the mechanism B adapts itself to the conditions of the work.

The side guides 18 of the boom have coextensive therewith upwardly divergent side boards or fenders 65 to prevent the gathered material from falling from the mechanism B during the conveying of such material through the trough 21 into the hopper 16 of the apparatus or machine.

Arranged in the circular end 15 of the carriage or body 12 are guide pulleys 62 having trained thereover cables 63, these being fixed to the coupling 36 and are preferably crossed at this point of connection and extend to windlass 64 where the same are reversely wound thereon and this windlass through suitable gear connection (not shown) is operated from the motor 58 so that the gatherer mechanism B can be automatically angularly adjusted for swinging action upon the king bolt 37 to bring the boom of said mechanism to any angle within an arc of approximately 180 degrees and thus the said mechanism can reach the work at any point of this arc of movement for the gathering of material and the conveying thereof to the hopper 16 of the apparatus or machine.

The loading or delivering mechanism C comprises a conveyor frame 65 involving the inner and outer spaced parallel sections 66 and 67 respectively, while the latter includes a lateral flexing portion 68 formed with pivotally joined knuckles 69, these constituting a part or unit with the sections 67 and trained about the same are endless universal jointed flight chains 74, each in its construction being of endless type and includes the separable hinge units 75 and the double pivot units 76, the pivots 77 of the latter engaging the hinge units 75 and the hinge 78 of this unit being of a separable kind. These chains 74 each has its hinge 78 at rightangles to the pivots 77 of the respective units 75 and 76 so that universal action in inherent in the chain.

The chains 74 carry pivotally supported foldable flight arms 79 these being pivoted at 80 and are formed with heel or trailer extensions 81 which are adapted to work against an abutment bar 82 carried at the inner edge of each section 66 and 67 and the flexing portion 68 of the conveyor frame while also carried by the latter at the outer edges thereof are abutment bars 83 which are designed to act upon the flight arms 79 to fold the same inwardly when traveling outside of the sections 66 and 67 and portions 68 of the conveyor frame.

The sections 67 of the conveyor frame at their inner ends are connected with the sections 66 through the medium of hinge points 84 so that the outer extent of said conveyor frame can be swung vertically for the raising and lowering thereof accordingly to the height of a mine car, while the sections 66 of the conveyor frame are forwardly inclined with a straight end 85 extended within the hopper 16 beneath its open discharge bottom for receiving the material poured into this hopper. The outer end portion 86 of the conveyor frame is reversely inclined or rearwardly sloped with respect to the forward portion thereof, the endless chains 74 being trained about sprockets 87 carried at the ends of the conveyor frame and one pair of these sprockets is supported in tensioning heads 88 while the other pair of said sprockets constituting the power element for the chains 74 are operatively connected through suitable gearing (not shown) to a power motor 58 whereby the chains 74 will be driven in unison and through the flights 79 will transfer the material from the hopper 16 through the trough 90 of the conveyor frame and deliver the same at its outer open bottom by a discharge chute 91 into a mine car.

Secured to the sections 67 at their undersides inwardly with respect to the flexing portions 63 is a bridge or guiding yoke 92 upon which flex the portions 68 so that the delivery end of the conveyor frame can be arcuately swung laterally and this bridge or yoke is supported upon lifting jacks 93 suitably mounted within the carriage or body 12 so that on operating the same the said sections 67 of the conveyor frame can be raised or lowered vertically for the positioning of the delivery end of said conveyor frame with respect to the mine car to be loaded therefrom. The jacks 93 are operated through the connection 94 by the motor 89 whereby the said jacks will be driven for the raising and lowering of sections 67 of the conveyor frame. Connected with the underside of the sections 67 outwardly with respect to the flexing portions 68 is a flexing yoke 95 having a center stem 96 pivoted at 97 for lateral arcuate swinging movement of said yoke. The stem 96 through the links 98 pivoted thereto and also pivoted to a throw arm 99 enables the arcuate shifting of said yoke, the arm 99 being operatively connected with a feed screw coupling 100 carried and shiftable upon a feed screw 101 suitably supported and having driving connection 102 with the motor 58. Thus it will be seen that when the screw 101 is operated from the motor motion will be imparted to the yoke 95 to laterally shift the same and this movement will be imparted to the outer delivery end of the conveyor frame, the sections 67 thereof being flexed at the portions 68 of the same and in this manner the said delivery end of the conveyor frame can be properly located relative to the position of a mine car to deliver material thereto and load the same.

The discharge chute 91 on the conveyor frame carries a spring closed mouth 103 and the flow of material from the conveyor frame at the open end thereof is had through this mouth as should be obvious.

Each truck 10 and 11 of the apparatus or machine carries a suitable electric driving mechanism (not shown) for transportation of the apparatus or machine to operating localities for the use thereof.

The flights 79 operate in a like manner to the gathering arms 23 so that when these travel in the troughs 21 and 90 respectively they will be in operating position while on travel of such elements outside of the troughs they will be in folded position and in this manner lessening the danger of injury to an operator of the apparatus or machine.

During the delivery or loading of a mine car the flights 79 operating in the mechanism C will transfer material from the trough 90 through the chute 91 and mouth 103 which opens under the weight of the load into the car and by the presence of the open end of the conveyor frame at the outer end portions of the sections 67 the flowing material into the car will be directed forwardly thereof and in this fashion the car will be filled by working the material from one end thereof forwardly and as such material is constantly dragged forward it will be automatically packed and pressed down so that the car is well filled and this operation being automatic dispenses with a rear operator on the apparatus or machine.

It is of course understood that the driving connections between the motor and the traveling parts of the apparatus or machine are controlled and regulated through suitable clutch mechanisms (not shown) and these may be of any standard construction and operated from a suitable point as may be conveniently selected, the details of the clutch mechanisms and the driving and driven connections being no part of the present invention.

The sections 66, 67 and flexing portions 68 of the conveyor frame carry at their upper sides suitable side boards or fenders 106 which prevent the falling of the material off of the conveyor frame to either side thereof during the operation of the loading or delivering mechanism C. The car coupling 104 serves for the purpose of connecting the mine car to the apparatus or machine when such car is being loaded therefrom.

The conveyor frame in the construction thereof is provided with ways 107 while the chains 74 are provided at their inner edges with guide ribs 108, these being designed to travel in the ways 107 so as to maintain the inner and outer stretches of the said chains straight during the travel thereof in the working thereof under the operation of the loading or delivering mechanism C irrespective of the extent of the flexing of said conveyor frame.

When the loaded car is being removed, it should be obvious by reason of the pivotal connections 80 for the flights 79, that coal or other like material that lies between and about the flights is not dragged off of said car, as said flights will swing free of the coal or other material without gripping action thereon. The flights fold by the action of the materials that may be heaped about them and thus do not drag it off of the loaded car as would be the case if the flights were rigidly held.

What is claimed is:—

1. In an apparatus or machine of the character described, a wheel truck having a carriage, a conveyor frame on the carriage and including inner and outer spaced sections, a lateral flexing portion arranged in one of the sections and having pivotally joined knuckles, endless flight chains arranged longitudinally of the conveyor frame and about said sections, foldable flight arms on said chains, a trough in the frame between the inner stretches of the chains and terminating short of the outer end of said conveyor frame, means on the frame and coacting with the flight arms to unfold the same when inwardly of the conveyor frame, means for folding said arms when working outside of the frame, and a bridge on the carriage to underlie the flexing portions of said sections.

2. In an apparatus or machine of the character described, a wheeled truck having a carriage, a conveyor frame on the carriage and including inner and outer spaced sections, a lateral flexing portion arranged in one of the sections and having pivotally joined knuckles, endless flight chains arranged longitudinally of the conveyor frame and about said sections, foldable flight arms on said chains, a trough in the frame between the inner stretches of the chains and terminating short of the outer end of said conveyor frame, means on the frame and coacting with the flight arms to unfold the same when inwardly of the conveyor frame, means for folding said arms when working outside of the frame, a bridge on the carriage to underlie the flexing portions of said sections, and means for moving the flexing portions.

3. In an apparatus or machine of the character described, a wheeled truck having a carriage, a conveyor frame on the carriage and including inner and outer spaced sections, a lateral flexing portion arranged in one of the sections and having pivotally joined knuckles, endless flight chains arranged longitudinally of the conveyor frame and about said sections, foldable flight arms on said chains, a trough in the frame between the inner stretches of the chains and terminating short of the outer end of said conveyor frame, means on the frame and coacting with the flight arms to unfold the same when inwardly of the conveyor frame, means for folding said arms when working outside of the frame, a bridge on the carriage to underlie the flexing portions of said sections, means for moving the flexing portions, and means for raising and lowering the outer sections of said conveyor frame.

4. In an apparatus or machine of the character described, a wheeled truck having a carriage, a conveyor frame on the carriage and including inner and outer spaced sections, a lateral flexing portion arranged in one of the sections and having pivotally joined knuckles, endless flight chains arranged longitudinally of the conveyor frame and about said sections, foldable flight arms on said chains, a trough in the frame between the inner stretches of the chains and terminating short of the outer end of said conveyor frame, means on the frame and coacting with the flight arms to unfold the same when inwardly of the conveyor frame, means for folding said arms when working outside of the frame, a bridge on the carriage to underlie the flexing portions of said sections, means for moving the flexing portions, means for raising and lowering the outer sections of said conveyor frame, and means for imparting motion to the endless chains.

5. In an apparatus or machine of the character described, a wheeled truck having a carriage, a conveyor frame on the carriage and including inner and outer spaced sections, a lateral flexing portion arranged in one of the sections and having pivotally joined knuckles, endless flight chains arranged longitudinally of the conveyor frame and about said sections, foldable flight arms on said chains, a trough in the frame between the inner stretches of the chains and terminating short of the outer end of said conveyor frame, means on the frame and coacting with the flight arms to unfold the same when inwardly of the conveyor frame, means for folding said arms when working outside of the frame, a bridge on the carriage to underlie the flexing portions of said sections, means for moving the flexing portions, means for raising and lowering the outer sections of said conveyor frame, means for imparting motion to the endless chains, and a hopper overlying the inner end of the conveyor frame.

6. In an apparatus or machine of the character described, a wheeled truck having a carriage, a conveyor frame on the carriage and including inner and outer spaced sections, a lateral flexing portion arranged in one of the sections and having pivotally joined knuckles, endless flight chains arranged longitudinally of the conveyor frame and about said sections, foldable flight arms on said chains, a trough in the frame between the inner stretches of the chains and terminating short of the outer end of said conveyor frame, means on the frame and coacting with the flight arms to unfold the same when inwardly of the conveyor frame, means for folding said arms when working outside of the frame, a bridge on the carriage to underlie the flexing portions of said sections, means for moving the flexing portions, means for imparting motion to the endless chains, a hopper overlying the inner end of the conveyor frame, and means for vertically adjusting the outer end of the conveyor frame.

7. In an apparatus or machine of the character described, a wheel truck having a carriage, a conveyor frame on the carriage and including inner and outer spaced sections, a lateral flexing portion arranged in one of the sections and having pivotally joined knuckles, endless flight chains arranged longitudinally of the conveyor frame and about said sections, foldable flight arms on said chains, a trough in the frame between the inner stretches of the chains and terminating short of the outer end of said conveyor frame, means on the frame and coacting with the flight arms to unfold the same when inwardly of the conveyor frame, means for folding said arms when working outside of the frame, a bridge on the carriage to underlie the flexing portions of said sections, means for moving the flexing portions, means for imparting motion to the endless chains, a hopper overlying the inner end of the conveyor frame, means for vertically adjusting the outer end of the conveyor frame, and a chute coacting with the outer end of the trough.

8. In an apparatus or machine of the character described, a wheeled truck having a carriage, a conveyor frame on the carriage and including inner and outer spaced sections, a lateral flexing portion arranged in one of the sections and having pivotally joined knuckles, endless flight chains arranged longitudinally of the conveyor frame and about said sections, foldable flight arms on said chains, a trough in the frame between the inner stretches of the chains and terminating short of the outer end of said conveyor frame, means on the frame and coacting with the flight arms to unfold the same when inwardly of the conveyor frame, means for folding said arms when working outside of the frame, a bridge on the carriage to underlie the flexing portions of said sections, means for moving the flexing portions, means for imparting motion to the endless chains, a hopper overlying the inner end of the conveyor frame, means for vertically adjusting the outer end of the conveyor frame, a chute coacting with the outer end of the trough, and an adjustable mouth on said chute.

9. In an apparatus or machine of the character described, a wheeled truck having a carriage, a conveyor frame on the carriage and including inner and outer spaced sections, a lateral flexing portion arranged in one of the sections and having pivotally joined knuckles, endless flight chains arranged longitudinally of the conveyor frame and about said sections, foldable flight arms on said chains, a trough in the frame between the inner stretches of the chains and terminating short of the outer end of said conveyor frame, means on the frame and coacting with the flight arms to unfold the same when inwardly of the conveyor frame, means for folding said arms when working outside of the frame, a bridge on the carriage to underlie the flexing portions of said sections, means for moving the flexing portions, means for imparting motion to the endless chains, a hopper overlying the inner end of the conveyor frame, means for vertically adjusting the outer end of the conveyor frame, a chute coacting with the outer end of the trough, an adjustable mouth on said chute, and side boards rising from said sections and arranged in upwardly divergent relation to each other.

10. The combination of a hopper between overlapped ends of gatherer and loading mechanisms and common to both of the same, a single carriage for the mechanisms and hopper, knuckle jointed sections in the loading mechanism and intermediate of its ends, means for flexing the knuckle jointed sections to move the loading mechanism at its outer end laterally, means raising and lowering the said outer end of the loading mechanism, and a chute inclined rearwardly from the loading mechanism.

11. The combination of a hopper between overlapped ends of gatherer and loading mechanisms and common to both of the same, a single carriage for the mechanisms and hopper, knuckle jointed sections in the loading mechanism and intermediate of its ends, means for flexing the knuckle jointed sections to move the loading mechanism at its outer end laterally, means raising and lowering the said outer end of the loading mechanism, a chute inclined rearwardly from the loading mechanism, and a gate adapted to be opened by the weight of the material on the chute.

12. The combination of a hopper between overlapped ends of gatherer and loading mechanisms and common to both of the same, a single carriage for the mechanisms and hopper, knuckle jointed sections in the loading mechanism and intermediate of its ends, means for flexing the knuckle jointed sections to move the loading mechanism at its outer end laterally, means raising and lowering the said outer end of the loading mechanism, a chute inclined rearwardly from the loading mechanism, a gate adapted to be opened by the weight of the material on the chute, and endless conveyor means at opposite sides of the loading mechanism.

13. The combination of a hopper between overlapped ends of gatherer and loading mechanisms and common to both of the same, a single carriage for the mechanisms and hopper, knuckle jointed sections in the loading mechanism and intermediate of its ends, means for flexing the knuckle jointed sections to move the loading mechanism at its outer end laterally, means raising and lowering the said outer end of the loading mechanism, a chute inclined rearwardly from the loading mechanism, a gate adapted to be opened by the weight of the material on the chute, and endless conveyor means at opposite sides of the loading mechanism and having foldable flights.

14. The combination of a hopper between overlapped ends of gatherer and loading mechanisms and common to both of the same, a single carriage for the mechanisms and hopper, knuckle jointed sections in the loading mechanism and intermediate of its ends, means for flexing the knuckle jointed sections to move the loading mechanism at its outer end laterally, means raising and lowering the said outer end of the loading mechanism, a chute inclined rearwardly from the loading mechanism, a gate adapted to be opened by the weight of the material on the chute, and endless conveyor means at opposite sides of the loading mechanism and having foldable flights, the conveyor means at opposite sides of the loading mechanism being extended beyond the chute.

15. The combination of a hopper between overlapped ends of gatherer and loading mechanisms and common to both of the same, a single carriage for the mechanisms and hopper, knuckle jointed sections in the loading mechanism and intermediate of its ends, means for flexing the knuckle jointed sections to move the loading mechanism at its outer end laterally, means raising and lowering the said outer end of the loading mechanism, a chute inclined rearwardly from the loading mechanism, a gate adapted to be opened by the weight of the material on the chute, endless conveyor means at opposite sides of the loading mechanism and having foldable flights, the conveyor means at opposite sides of the loading mechanism being extended beyond the chute, and a wheeled truck supporting the carriage.

16. The combination of a hopper between overlapped ends of gatherer and loading mechanisms and common to both of the same, a single carriage for the mechanism and hopper, knuckle jointed sections in the loading mechanism and intermediate of its ends, means for flexing the knuckle jointed sections to move the loading mechanism at its outer end laterally, a chute inclined rearwardly from the loading mechanism, a gate adapted to be opened by the weight of the material on the chute, endless conveyor means at opposite sides of the loading mechanism and having foldable flights, the conveyor means at opposite sides of the loading mechanism being extended beyond the chute, a wheeled truck supporting the carriage, means for raising and lowering the outer end of said loading mechanism, and a bridge beneath said loading mechanism and supporting the knuckle jointed sections thereof.

RODERICK MacEACHEN.